Jan. 16, 1923.

H. CARLL.
SEPARATION TRAP FOR PULVERIZING MACHINES.
FILED JUNE 8, 1921.

1,442,466

3 SHEETS-SHEET 1

Witness:
Chr. Olson

Inventor:
Harry Carll
By Clarence Chamberlain Atty.

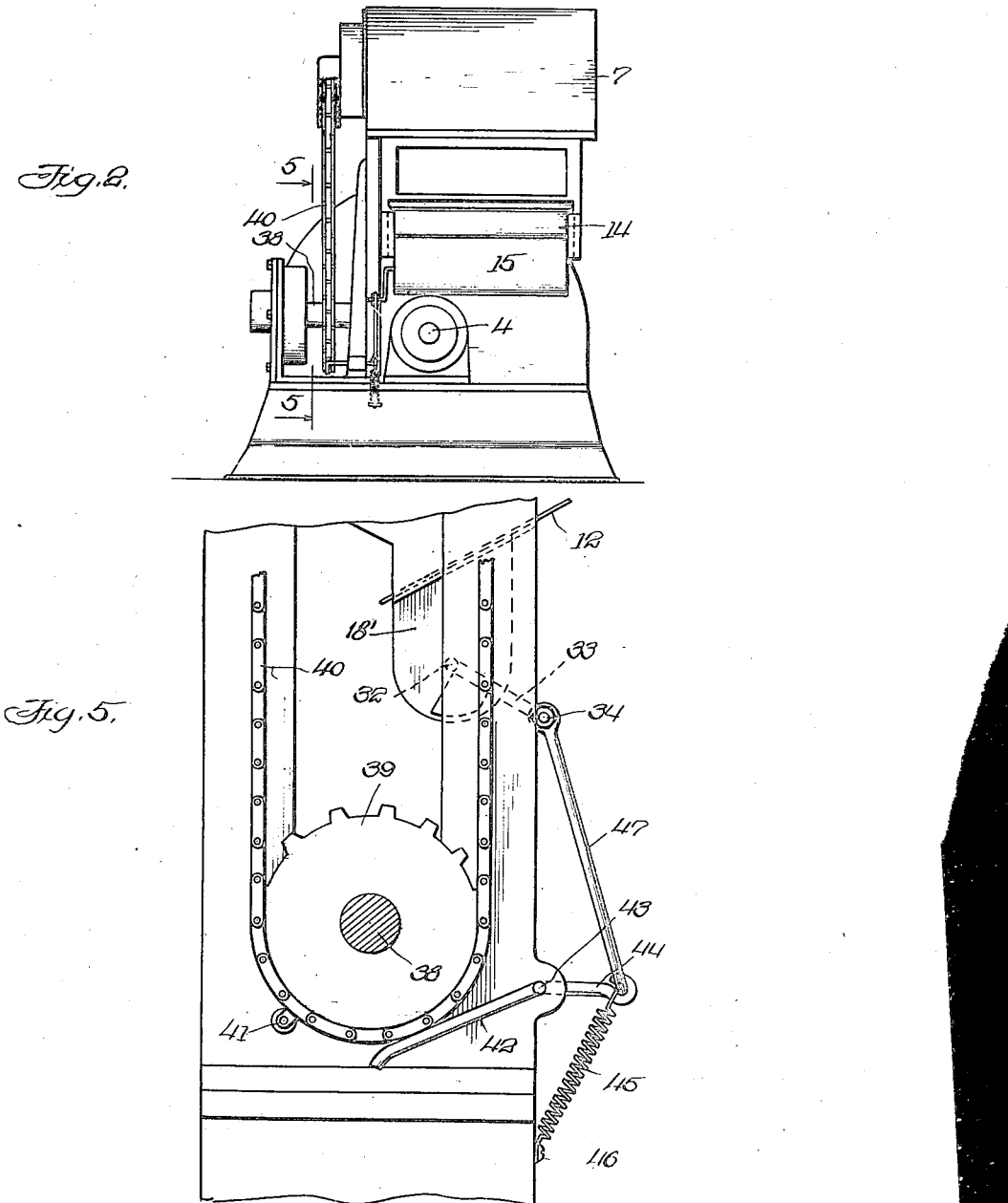

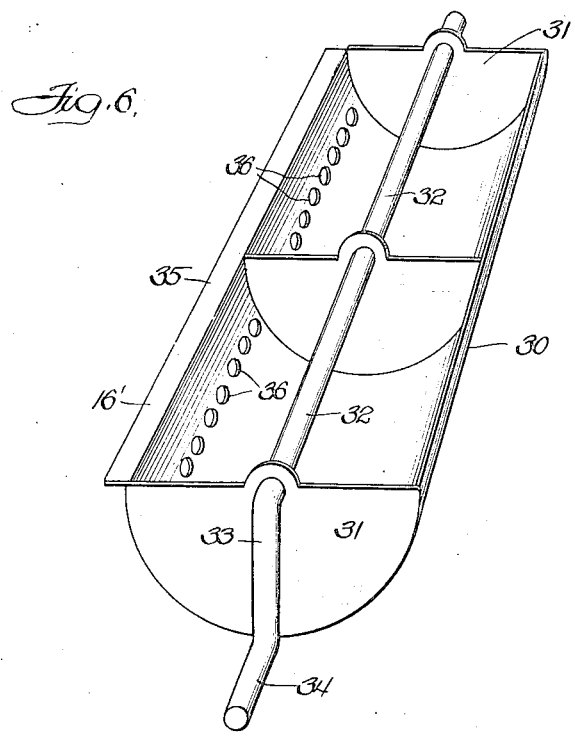
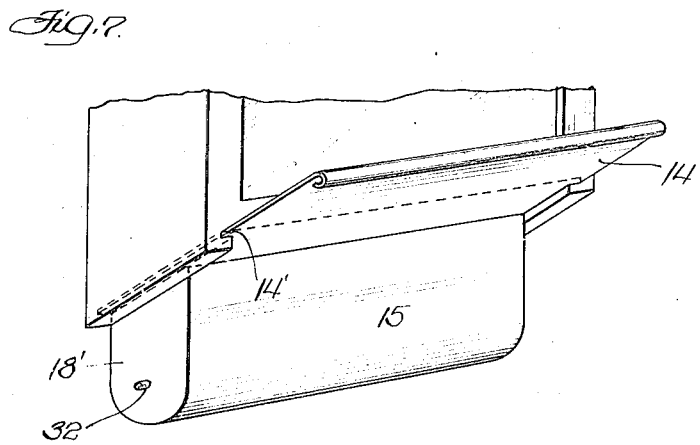

Patented Jan. 16, 1923.

1,442,466

UNITED STATES PATENT OFFICE.

HARRY CARLL, OF TACOMA, WASHINGTON, ASSIGNOR TO B. F. GUMP COMPANY, OF CHICAGO, ILLINOIS.

SEPARATION TRAP FOR PULVERIZING MACHINES.

Application filed June 8, 1921. Serial No. 476,018.

*To all whom it may concern:*

Be it known that I, HARRY CARLL, a citizen of the United States, residing at the city of Tacoma, in the county of Pierce and State of Washington, have invented certain new and useful Improvements in Separation Traps for Pulverizing Machines, of which the following is a specification.

My invention relates to the art of pulverizing materials by grinding or otherwise and particularly to the removal of foreign substances from the material to be comminuted, by the action of air currents by which the material is carried to the reduction portion of the machine. It is one object of my invention to provide a feeder trap which may be a part of or attached to the mechanism of the machine and operable thereby, by means of which foreign materials of greater specific gravity than material to be ground may be separated therefrom and received within the trap. It is a further object of my invention to provide means for controlling the intensity of air currents within the machine by which very close and accurate differences in the specific gravity of materials may be taken advantage of to separate them from each other, and further to so operate the said trap or trap member that the removed material may be discharged from the machine without substantially interfering with the character and intensity of the air flow and the uniformly constant operation of the air in producing such separations.

Figure 1:
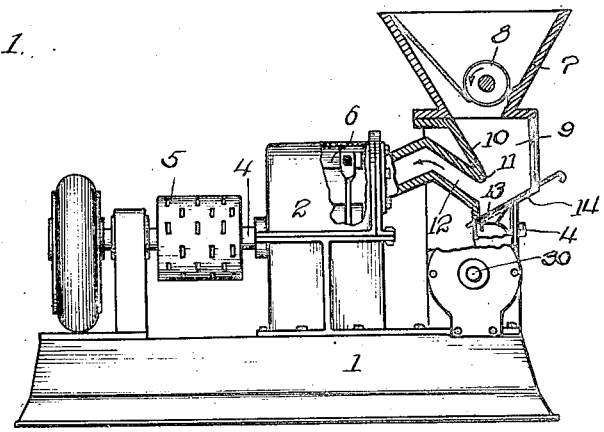
Figure 3:
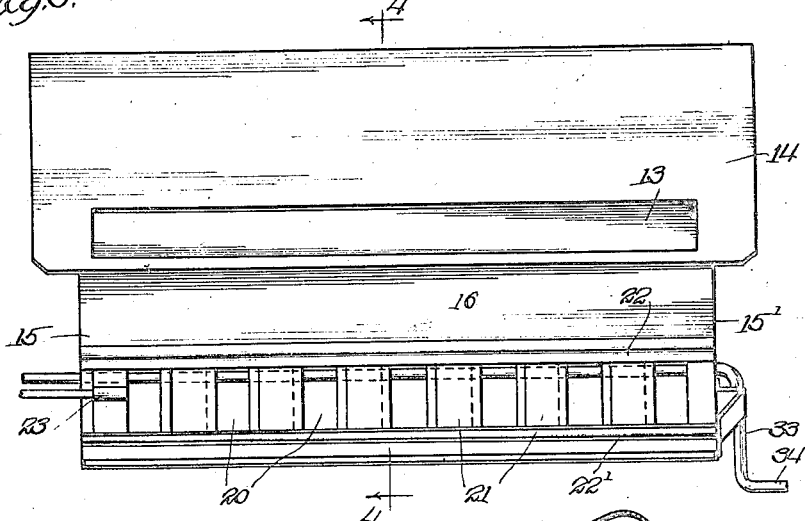
Figure 4:
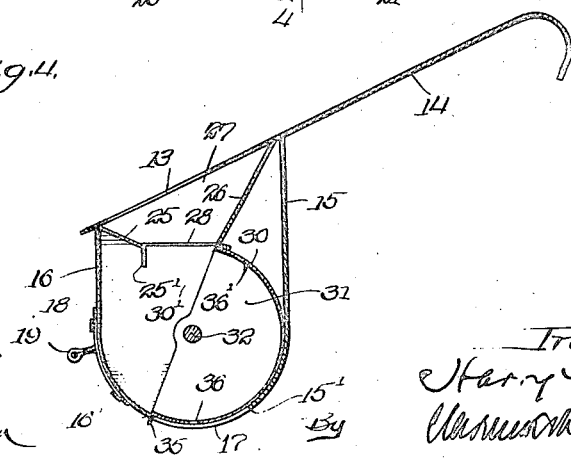

A device embodying the principles of my invention is illustrated in the drawings in which Fig. 1 shows a pulverizing machine of the character set forth, partly in section, to show the operation of my improvement as applied thereto. Fig. 2 is an end view looked at from the right. Fig. 3 is an enlarged view of my device as seen in Fig. 2. Fig. 4 is a section on the line 4—4 of Fig. 3. Fig. 5 is an enlarged view of a portion of Fig. 1 illustrating means for operatively connecting my device with the mill as shown. Fig. 6 is an enlarged perspective view of the trap closure removed from the apparatus. Fig. 7 is an enlarged perspective view showing the attachment of my device to the pulverizer.

I have illustrated my invention by reference and in its application to a certain well known mill which is on the market under the trade-name of "Bar-Nun" grinder and which is subject matter of a certain patent on pulverizers issued to J. W. Barwell, October 10, 1916, as No. 1,201,135 in which a plurality of revolving radially extending beaters co-operate with a peripheral shell to comminute the material.

Describing my invention with reference to the drawings in which like characters of reference denote like parts throughout, 1 is the base of a grinding machine and 2 is a reduction or comminution chamber within which is enclosed the comminuting mechanism which is driven by shaft 4 connected with a motor 5. A series of beater bars 6 are revolved within the chamber 2 by means of said shaft 4 in the well known manner of the apparatus referred to; 7 is a hopper in which the material to be treated is placed and the movement of which is controlled by feed roll 8 so that it passes in an even and uniform stream into an air chamber 9. As the beater bars in the comminuting chamber are revolved at a high rate of speed, approximately 3500 revolutions per minute, a strong suction is produced, but the normal flow of air will be blocked by the material in the hopper and by the feeding mechanism. As the grain descends into the air chamber it will strike upon the partition 10 extended downwardly and slantingly and flow over the point 11 thereof in a substantially uniformly even stream or curtain.

By means of my invention I provide a regulated flow of air into the air chamber 9 by which the lighter portions comprising the material to be ground will be deflected and pass in the direction of the arrows through the passageway 12 while the relatively heavier material which is to be rejected will pass through the aperture 13 in removable slide 14 as hereinafter described. The ends of said slide engage suitable grooves 14' in the casing, thereby providing a means by which the feeder trap may be removably attached to the casing of the grinding device. 15 is a rear wall of the trap attached to the said slide and extended downwardly to the point 15'. 16 is a front wall thereof extended downwardly to the point 16'; an outlet space or opening 17 being left between the lower edges of the said walls extending longitudinally from end to end thereof. 18 and 18' are end walls by which the front and rear walls are connected. A valve casing is thus formed within which the trap closure or valve hereinafter described is operatively mounted. A series of air openings 20 is formed in the front wall 16 and a damper slide having the members 21 with spaces therebetween corresponding to the openings 20 in the front wall is mounted in the guide-ways 22 and 22' by which the amount of air passing through the openings may be accurately regulated as desired. A handle 23 is attached to the damper slide for the purpose of ready adjustment thereof. Below the longitudinal opening 13 in slide 14 is a downwardly slanting guidepiece 25 which extends from end to end of the apparatus below the said opening and is provided at its lower edges with a downwardly projecting flange 25'. A similar downwardly slanting guide-piece 26 extends from end to end of the device below the aperture 13 in slide 14 forming with guide piece 25 and end pieces 27 a hopper like detent chamber from which refuse material will normally pass to the valve chamber through the inlet opening 28.

Within the downwardly extending walls 15 and 16 the lower extremities of which are formed in segments of a circle, is mounted a semi-cylindrical trap valve or closure having the segmental wall 30 and the ends 31. A shaft 32 is rigidly attached to the said end walls of the trap member and is journaled in the end walls of the casing. One end of said shaft extends through one of the walls 18' of the casing and is provided with a crank arm 33, 34 by which movement on its longitudinal axis may be given to the trap closure. One edge of said segmental wall 30 has a flange 35 downwardly projecting through the opening formed between the lower portions 15' and 16' of the casing and establishes the limit of movement of the said trap closure to the closed position as shown in Fig. 4.

A shaft 38 operatively connected with the mechanism of the grinding machine carries a sprocket wheel 39 over which runs a sprocket chain 40 which drives the feed roll 8. Said sprocket chain is provided with a trip member 41 adapted to contact with the lever 42 having a shaft 43 pivoted on the framework of the machine. A lever 44 is mounted on the other end of said shaft and the parts are held in normal position by the spring 45 which connects the lever 44 with the machine frame at 46. A rod 47 connects the lever 44 with crank arm 33, 34 whereby the trap shaft 32 is rotated within the limit of movement of the segmental trap closure 30 mounted thereon.

It will be seen that when my device is placed as shown in the drawings with reference to the other machinery and parts thereof and so that they are in the relative positions shown in Fig. 4 and when the machine is in operation, the lighter materials which are to be ground will pass through the passage 12 as hereinbefore stated; the relatively heavier refuse material will pass downwardly through the slide aperture 13 and the inlet casing opening 28 and, be received upon the inner face of the trap closure within the trap. An upward current of air through the openings 21 in the damper and openings 36 in the lower portion of the semi-cylindrical trap closure when in normal position will further force back the light materials while not interfering with the movement of the refuse material of greater specific gravity. When the trip member 41 comes in contact with lever 42, the shaft 32 is given a partial rotation together with the trap closure attached thereto thus uncovering the outlet opening between the lower ends 15' and 16' of the rear and front walls and causing the front edge 30' of 30 to contact with the flange 25' thereby stopping the further flow of material into the trap and providing a temporary lodgement therefor within the detent chamber. When the trip member 41 ceases to contact with arm 42 it will be restored to its normal position together with the attached parts and the refuse material will fall into the trap as before described.

Openings 36' in the upper part of the trap closure provide for a flow of air which passes through the slide aperture 13 by which an air current is provided to aid, when the closure is in the tripped position, in keeping the lighter materials within the stream of their natural flow; while the heavier material which may be dropped will be received on the upper part of the trap closure within the detent chamber and held thereon until said member is oscillated to its normal position, whereupon they will flow through casing inlet opening 28, and be received in the inner part of the trap member whence they will be discharged at its next cycle of operation. It will be seen that a uniform opening and closing of the trap is thus provided, by which the normal air flow remains substantially constant and by which the refuse materials are continuously removed from the feed flow and ejected from the machine. It will further be apparent that, by means of the damper in the casing the flow of air to the air chamber may be regulated with the effect of separating different classes of material of the same general character from each other in accordance with their relative specific gravity.

While I have described my invention in its application to a machine of particular construction I am not to be limited in its application thereto as it may be used with any machinery, in which a flow of material can be deflected by an air current, to separate components of different specific gravity.

And, while I have shown a practical and operative form thereof, it will be apparent that changes therein may be made without departing from the principles of my invention.

I claim:—

1. A separation trap for pulverizing machines having means for producing a current of air to create and laterally divert a feed flow; said trap comprising a casing having an inlet opening and adapted to be attached to said machine below the point of lateral divergence of the feed flow and having an outlet opening, a trap closure movable in the casing normally adapted to close the outlet opening and receive material through the inlet opening, and means adapted to be operatively connected with the pulverizing machine for moving the said trap closure whereby material in the trap will be discharged through the outlet opening.

2. A separation trap for pulverizing machines having an air chamber and means for producing a current of air therein to create and laterally divert a feed flow; said trap comprising a casing having an inlet opening and adapted to be attached to said machine below the point of lateral divergence of the said flow and having an outlet opening in the lower part thereof, means for admitting and controlling the flow of air into the said air chamber, a trap closure movable in the casing normally adapted to close the outlet opening and receive material through the inlet opening, and means adapted to be operatively connected with the pulverizing machine for moving the said trap closure whereby material in the trap will be discharged through the outlet opening.

3. A separation trap for pulverizing machines having means for producing a current of air to create and laterally divert a feed flow; said trap comprising a casing having an upper inlet opening adapted to be attached to said machine below the point of lateral divergence of the said flow and having an outlet opening in the lower part thereof, a trap closure provided with air openings and movable in the casing normally adapted to close the outlet opening and receive material through the inlet opening, and means adapted to be operatively connected with the pulverizing machine for moving the said trap closure whereby the top opening will be closed and material in the trap will be discharged through the outer opening.

4. A separation trap for pulverizing machines having means for producing a current of air to create and laterally divert a feed flow; said trap comprising a casing including a top having an inlet opening therein adapted to be attached to said machine below the point of lateral divergence of said feed flow and segmental side walls having their lower portions spaced from each other to form an outlet opening, a semi-cylindrical trap closure reciprocally mounted in the casing normally adapted to close the outlet opening and receive material through the opening in the top of the casing, and means operatively connected with the pulverizing machine for moving said trap closure whereby the top opening will be closed and material in the trap be discharged through the outlet opening.

5. A separation trap for pulverizing machines having means for producing a current of air to create and laterally divert a feed flow; said trap comprising a casing including a top having an inlet opening adapted to be attached to said machine below the point of lateral divergence of said feed flow and segmental side walls having their lower portions spaced from each other to form an outlet opening, a semi-cylindrical trap closure axially mounted in the casing normally adapted to close the outlet opening and receive material through the opening in the top of the casing, and means operatively connected with the pulverizing machine for moving said trap closure whereby the top opening will be closed and material in the trap be discharged through the outlet opening.

6. A separation trap for pulverizing machines having means for producing a current of air to create and laterally divert a feed flow; said trap comprising a casing having an inlet opening adapted to be attached to said machine below the point of lateral divergence of the feed flow and having an outlet opening, a trap closure movable in the casing adapted alternatively to receive and discharge material passing through said machine and adjustable means in the casing for regulating the flow of air to the said pulverizing machine.

7. In combination with a pulverizing machine having means for producing a current of air to create and laterally divert the feed flow, a trap casing having a valve chamber provided with an outlet opening and an inlet opening adapted to be placed below the point of lateral divergence of the feed flow, a closure reciprocally movable in the valve chamber adapted at one point of its movement to close the said outlet opening and receive material through the inlet opening and at another point of its movement adapted to discharge such received material through the outlet opening and close the inlet opening and means for operatively connecting said closure with the pulverizing machine mechanism.

8. In combination with a pulverizing machine having means for producing a current of air to create and laterally divert the feed flow, a trap casing having a valve chamber provided with an outlet opening and an inlet opening adapted to be placed below the point of lateral divergence of the feed flow, a closure reciprocally movable in the valve chamber adapted at one point of its movement to close the said outlet opening and receive material through the inlet opening and at another point of its movement adapted to discharge such received material through the outlet opening and close the inlet opening and means for operatively connecting said closure with the pulverizing machine mechanism.

9. In combination with a pulverizing machine having means for producing a current of air to create and laterally divert the feed flow, a trap casing having a valve chamber provided with an outlet opening and an inlet opening adapted to be placed below the point of lateral divergence of the feed flow, a detent chamber above the valve chamber, a closure reciprocally movable in the valve chamber adapted at one point of its movement to close the said outlet opening and receive material through the inlet opening and at another point of its movement adapted to discharge such received material through the outlet opening and close the inlet opening whereby material moving toward said inlet opening will be retained in the detent chamber and means for operatively connecting said closure with the pulverizing machine mechanism.

10. A separation trap for pulverizing machines having means for producing a current of air to create and laterally divert a feed flow; said trap comprising a casing having an inlet opening adapted to be attached to said machine below the point of lateral divergence of the feed flow and having an outlet opening, a trap closure provided with air openings and movable in the casing adapted alternatively to receive and discharge material passing through said machine and adjustable means in the casing for regulating the flow of air to the said pulverizing machine.

In witness whereof, I have hereto set my hand at Tacoma, Washington, this 13th day of April, 1921.

HARRY CARLL.